US008699298B1

(12) United States Patent
Sheng et al.

(10) Patent No.: US 8,699,298 B1
(45) Date of Patent: *Apr. 15, 2014

(54) 3D MULTIPLE PREDICTION AND REMOVAL USING DIPLETS

(75) Inventors: Jianming Sheng, Sugar Land, TX (US); Chengbin Peng, Sugar Land, TX (US)

(73) Assignee: WesternGeco L.L.C., Houston, TX (US)

( * ) Notice: Subject to any disclaimer, the term of this patent is extended or adjusted under 35 U.S.C. 154(b) by 848 days.

This patent is subject to a terminal disclaimer.

(21) Appl. No.: 12/491,418

(22) Filed: Jun. 25, 2009

Related U.S. Application Data

(60) Provisional application No. 61/076,045, filed on Jun. 26, 2008.

(51) Int. Cl.
*G01V 1/00* (2006.01)

(52) U.S. Cl.
USPC .............................................. 367/73; 702/17

(58) Field of Classification Search
USPC .............................................. 702/17; 367/73
See application file for complete search history.

(56) References Cited

U.S. PATENT DOCUMENTS

| 4,797,860 A | 1/1989 | Quaglino |
| 5,206,837 A | 4/1993 | Beasley et al. |
| 5,274,605 A | 12/1993 | Hill |
| 5,530,679 A | 6/1996 | Albertin |
| 5,640,368 A | 6/1997 | Krebs |
| 5,671,136 A | 9/1997 | Willhoit, Jr. |
| 5,946,271 A | 8/1999 | Dragoset, Jr. |
| 6,028,819 A | 2/2000 | Mullarkey et al. |
| 6,049,759 A | 4/2000 | Etgen |
| 6,055,482 A | 4/2000 | Sudhakar et al. |
| 6,253,157 B1 | 6/2001 | Krebs |
| 6,343,256 B1 | 1/2002 | Winbow et al. |
| 6,493,634 B1 | 12/2002 | Krebs et al. |
| 6,697,737 B2 | 2/2004 | Jones et al. |
| 6,735,527 B1 | 5/2004 | Levin |
| 6,757,217 B2 | 6/2004 | Eastwood et al. |
| 6,763,305 B2 | 7/2004 | Bernitsas |
| 6,785,612 B1 | 8/2004 | Zhang |
| 7,072,767 B2 | 7/2006 | Routh et al. |
| 7,480,206 B2 | 1/2009 | Hill |

(Continued)

FOREIGN PATENT DOCUMENTS

WO 2005008292 A1 1/2005

OTHER PUBLICATIONS

Albertin, et al., True-Amplitude Beam Migration, SEG International Exposition and 74th Annual Meeting, Oct. 2004.

(Continued)

*Primary Examiner* — Mark Hellner

(57) ABSTRACT

Methods, software, and computer systems for 3D multiple prediction and removal are disclosed. The method includes determining a set of input diplets. The method includes, for one or more data diplets from the set of input diplets downward propagating the data diplet to model reflection of the data diplet at a location of at least one subsurface discontinuity and determining one or more predicted multiple diplets, based, at least in part on the data diplet and the modeled downward propagated and reflected diplet. The method includes comparing diplets in the set of input diplets with the one or more multiple diplets to determine a set of multiple diplets and a set of demultipled diplets.

18 Claims, 5 Drawing Sheets
(3 of 5 Drawing Sheet(s) Filed in Color)

(56) References Cited

U.S. PATENT DOCUMENTS

| | | | |
|---|---|---|---|
| 7,937,224 B2 * | 5/2011 | Peng | 702/17 |
| 7,970,546 B1 * | 6/2011 | Peng | 702/16 |
| 8,010,293 B1 * | 8/2011 | Peng et al. | 702/14 |
| 2005/0129324 A1 | 6/2005 | Lemke | |
| 2005/0135189 A1 | 6/2005 | Wang | |
| 2005/0197779 A1 | 9/2005 | Stinson et al. | |
| 2005/0207278 A1 | 9/2005 | Reshef et al. | |
| 2006/0018191 A1 | 1/2006 | Kappius et al. | |
| 2006/0133206 A1 | 6/2006 | Barnes | |
| 2006/0227662 A1 | 10/2006 | Foy | |
| 2007/0271041 A1 | 11/2007 | Peng | |
| 2009/0037114 A1 | 2/2009 | Peng et al. | |
| 2009/0043549 A1 | 2/2009 | Peng | |
| 2011/0153218 A1 | 6/2011 | Peng | |

OTHER PUBLICATIONS

Gray, Gaussian Beam Migration of Common-Shot Records, SEG International Exposition and 74th Annual Meeting, Oct. 2004.

Nowack, Common-Offset Gaussian Beam Inversion: Final Report, Earth and Atmospheric Sciences, Purdue University, Jul. 2004.

Raz, Beam Stacking: A Generalized Preprocessing Technique, Geophysics, Sep. 1987, pp. 1199-1210, vol. 52, No. 9.

Chavez-Perez, et al., Crustal Imaging in Southern California using Earthquake Sequences, 7th International Symposium on Deep Seismic Profiling of the Continents, Sep. 1996.

Hennenfent, et al., Seismic Denoising with Nonuniformly Sampled Curvelets, Noise and Signal Interaction, IEEE, 2006.

Nowack, et al., The Two-Dimensional Gaussian Beam Synthetic Method: Testing and Application, Journal of Geophysical Research, Sep. 10, 1984, pp. 7797-7819, vol. 89, No. B9.

Wu, et al., Wave Propagation and Imaging Using Gabor-Daubechies Beamlets, Modeling and Imaging Laboratory, IGPP, University of California, Oct. 2001.

3D Beam Prestack Depth Migration with Examples from Around the World, Tech Link, A Publication of Petroleum Geo-Services, Aug. 2008, pp. 1-6, vol. 8, No. 8.

Chen, et al., Target-Oriented Beamlet Migration Based on Gabor-Daubechies Frame Decomposition, Geophysics, Mar.-Apr. 2006, pp. S37-S52, vol. 71, No. 2.

Jin, et al., Seismic Depth Migration with Pseudo-Screen Propagator, Computational Geoscience, 1999, pp. 321-335, vol. 3.

Alkhalifah, "Gaussian beam depth migration for anisotropic media," Geophysics, Sep.-Oct. 1995, vol. 60(5): pp. 1474-1484.

Brandsberg-Dahl et al., "Focusing in dip and AVA compensation on scattering-angle/azimuth common image gathers," Geopyics, Jan.-Feb. 2003, vol. 68(1): pp. 232-254.

Gray et al., "Depth model building by interactive manual tomography," SEG Expanded Abstracts, 2000: pp. 1-4.

Hua et al., "Parsimonious 2D prestack Kirchhoff depth migration," Geophysics, May-Jun. 2003, vol. 68(3): pp. 1043-1051.

Sun et al., "3-D prestack Kirchhoff beam migration for depth imaging," Geophysics, Sep.-Oct. 2000, vol. 65(5): pp. 1592-1603.

* cited by examiner

3D MULTIPLE PREDICTION AND REMOVAL USING DIPLETS

CROSS-REFERENCE TO RELATED APPLICATION

This application claims priority to U.S. Provisional Patent Application No. 61/076,045, filed Jun. 26, 2008, entitled "3D Multiple Prediction and Removal using Diplets," by Jianming Sheng and Chengbin Peng, which is hereby incorporated by reference. This application is related to U.S. patent application Ser. No. 11/749,795, filed May 17, 2007, entitled "Diplet-Based Seismic Processing," by Chengbin Peng which is hereby incorporated by reference.

BACKGROUND

The present disclosure relates generally to seismic imaging. More specifically, the present disclosure relates to methods, software, and systems for 3D multiple prediction and removal.

"Noise" is always present in migrated seismic volumes. Some of these noises are due to multiple reflections as seismic waves propagate in the subsurface. These multiple reflections are essentially false images in the subsurface that can often add to the drilling risk for oil and gas exploration if they are wrongly characterized as real events. This is especially true for deep and complex targets such as subsalt, where primary reflections are weak and multiple reflections are strong. As a result, the oil and gas industry has invested significant resources in the processing of seismic data in an effort to remove or attenuate multiples in seismic data.

3D surface related multiple elimination (3DSRME), is a widely accepted method for predicting and removing multiples in seismic data. In general, 3DSRME, requires areal coverage of sources and receivers in 3D space and is computationally expensive. Generally, the 3DSRME method requires seismic traces at zero offset which are often not available for both narrow azimuth and wide azimuth marine seismic data. Current industry practices are to create the zero offset data using very simplified data extrapolation and migration methods. These practices may, however, lead to errors in predicting and removing multiples from input seismic data, sometimes even to the extent that primary reflections are removed while the multiples are left behind.

SUMMARY OF THE INVENTION

In general, in one aspect, the invention features a method for 3D multiple prediction and removal. The method includes determining a set of input diplets. The method includes, for one or more data diplets from the set of input diplets downward propagating the data diplet to model reflection of the data diplet at a location of at least one subsurface discontinuity and determining one or more predicted multiple diplets, based, at least in part on the data diplet and the modeled downward propagated and reflected diplet. The method includes comparing diplets in the set of input diplets with the one or more multiple diplets to determine a set of multiple diplets and a set of demultipled diplets.

In general, in a second aspect, the invention features a computer program stored in a tangible medium for 3D multiple prediction and removal. The computer program includes executable instructions that when executed cause at least one processor to determine a set of input diplets; for one or more data diplets from the set of input diplets: downward propagate the data diplet to model reflection of the data diplet at a location of at least one subsurface discontinuity; determine one or more predicted multiple diplets, based, at least in part on the data diplet and the modeled downward propagated and reflected diplet; and compare diplets in the set of input diplets with the one or more multiple diplets to determine a set of multiple diplets and a set of demultipled diplets.

In general, in a third aspect, the invention features a computer for 3D multiple prediction and removal, including at least one processor; a memory, wherein the memory comprises executable instructions that when executed cause the at least one processor to: determine a set of input diplets; for one or more data diplets from the set of input diplets: downward propagate the data diplet to model reflection of the data diplet at a location of at least one subsurface discontinuity; determine one or more predicted multiple diplets, based, at least in part on the data diplet and the modeled downward propagated and reflected diplet; compare diplets in the set of input diplets with the one or more multiple diplets to determine a set of multiple diplets and a set of demultipled diplets.

The present disclosure explores the multi-dimensional attribute space of each diplet and presents intelligent ways to model and remove multiple reflections in seismic data. One advantage of the methods disclosed herein, is that they do not require areal coverage of input seismic traces and the methods work equally well for narrow azimuth and wide azimuth marine seismic data. Another advantage of the methods disclosed herein, is that the methods can be used for multiple prediction and removal in the migrated domain as well and is computationally efficient. Certain embodiments of the present disclosure may exhibit none, some or all of these advantages.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
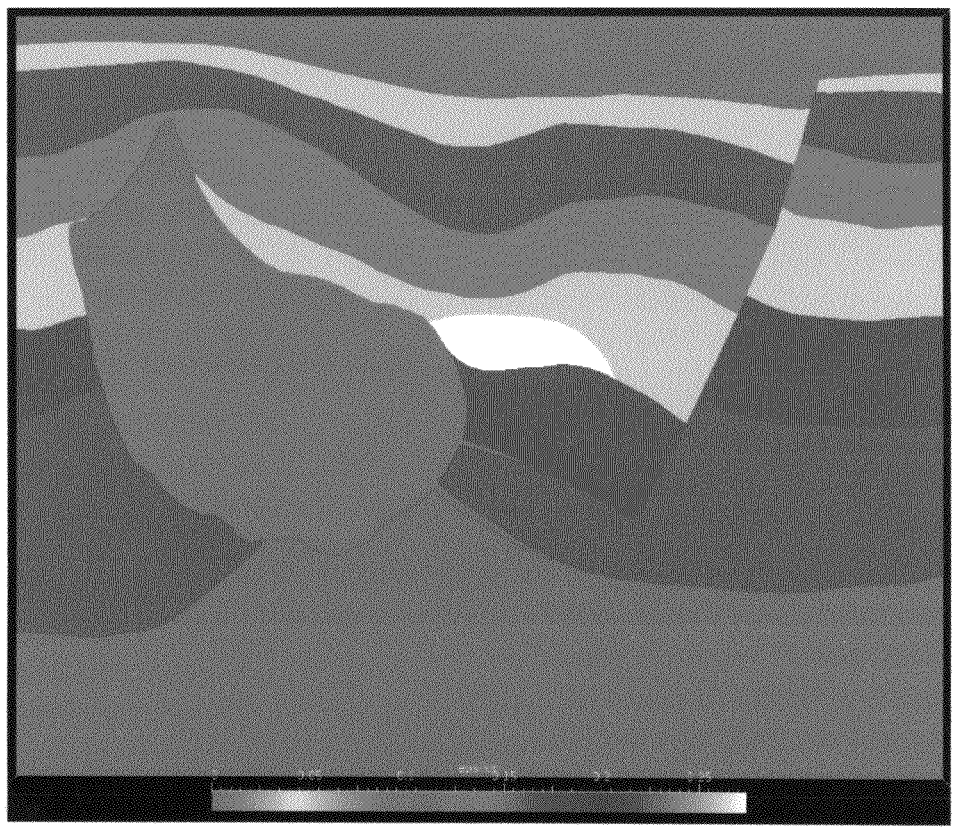
FIG. 1 is an anisotropic velocity model for Amerada Hess synthetic data.

Certain embodiments of the present disclosure are related to 3D prediction and removal of multiples in seismic data and seismic images using diplets, a process of diplet decomposition, diplet migration or demigration, diplet modeling for potential multiples, diplet selection to separate diplets that are associated with multiples (or "multiple diplets") from diplets that do not have any multiples (or "de-multipled diplets"), and diplet synthesis. The methods, systems, and software described in this disclosure have uses in, for example, seismic data processing, seismic interpretation, and well drilling.

Rather than requiring complete areal coverage of each shot record for 3DSRME application, the 3D diplet based multiple prediction method decomposes seismic data into diplets which contain local attributes, such as one or more of travel time, dips, coherency, and amplitude. The diplets can either be remigrated or demigrated, and a one-to-one correspondence can be created between time-domain and depth-domain diplets. With the help of this kind of correspondence, diplet-based multiple prediction method predicts Multiple Diplets using data diplets such that no dense trace coverage in each shot record is required, allowing multiple prediction for both narrow azimuth marine seismic data and wide azimuth marine seismic data.

After the prediction of multiple diplets, the multiples in the data diplets can be identified if their dips, locations and wavelet characteristics can be matched with some predicted multiple diplets. Multiple-free data can be obtained by synthesizing all diplets that do not belong to the collection of multiple diplets. The diplet separation can be done either prior to diplet migration or after diplet migration.

Surface related multiples which bounce downward from surface at least once can be expressed as convolution of the recorded seismic data and Green's function as:

$$M(\vec{x}_S, \vec{x}_R) = \sum_{\vec{x}_{R'}} D(\vec{x}_S, \vec{x}_{R'}) G(\vec{x}_{R'}, \vec{x}_R), \quad (1)$$

where $D(\vec{x}_S, \vec{x}_{R'})$ denotes the recorded data in frequency domain at receiver position $i_R$, for source at $\vec{x}_S$, and $G(\vec{x}_{R'}, \vec{x}_R)$ represents the Green's function for source at $\vec{x}_{R'}$ and receiver at $\vec{x}_R$.

Using local plane wave assumption, the recorded seismic data can be expressed as the superposition of "diplets", that is, $$D(\vec{x}_S, \vec{x}_{R'}) = \sum_i \delta_i^{SR'}, \quad (2)$$

in which each diplet represents a local plane wave which propagates to the surface at certain dips and is recorded at certain receivers at certain traveltimes.

After diplet decomposition, surface related multiples can be predicted using diplets as $$M(\vec{x}_S, \vec{x}_R) = \sum_{\vec{x}_{R'}} \sum_i \delta_i^{SR'} G(\vec{x}_{R'}, \vec{x}_R). \quad (3)$$

If we rearrange the order of summation in above equation, we have, $$M(\vec{x}_S, \vec{x}_R) = \sum_i \sum_{\vec{x}_{R'}} \delta_i^{SR'} G(\vec{x}_{R'}, \vec{x}_R) - \sum_j \Delta_j^{SR}, \quad (4)$$

in which $\Delta_j^{SR} = \delta_{i_j}^{SR'} G(\vec{x}_{R'_j}, R)$ denotes a diplet that belongs to predicted multiple data. This diplet can be obtained by propagating downward the corresponding diplet at the associated receiver position. For some significant events like water-bottom, top of salt etc, we can have corresponding surfaces in the depth-domain and the Green's function can then be implemented by reflection ray tracing.

Equation (4) shows that each input diplet can predict at least one diplet that is potentially a seismic reflection multiple. In certain implementations, the predicted multiple-domain diplets are not at field acquisition receiver positions. Instead, the predicted multiple-domain diplets can be synthesized into predicted multiple volumes with similar sampling and dimensions as the original data. In certain implementations, the methods do not require seismic data at close to zero offset.

Figure 5:
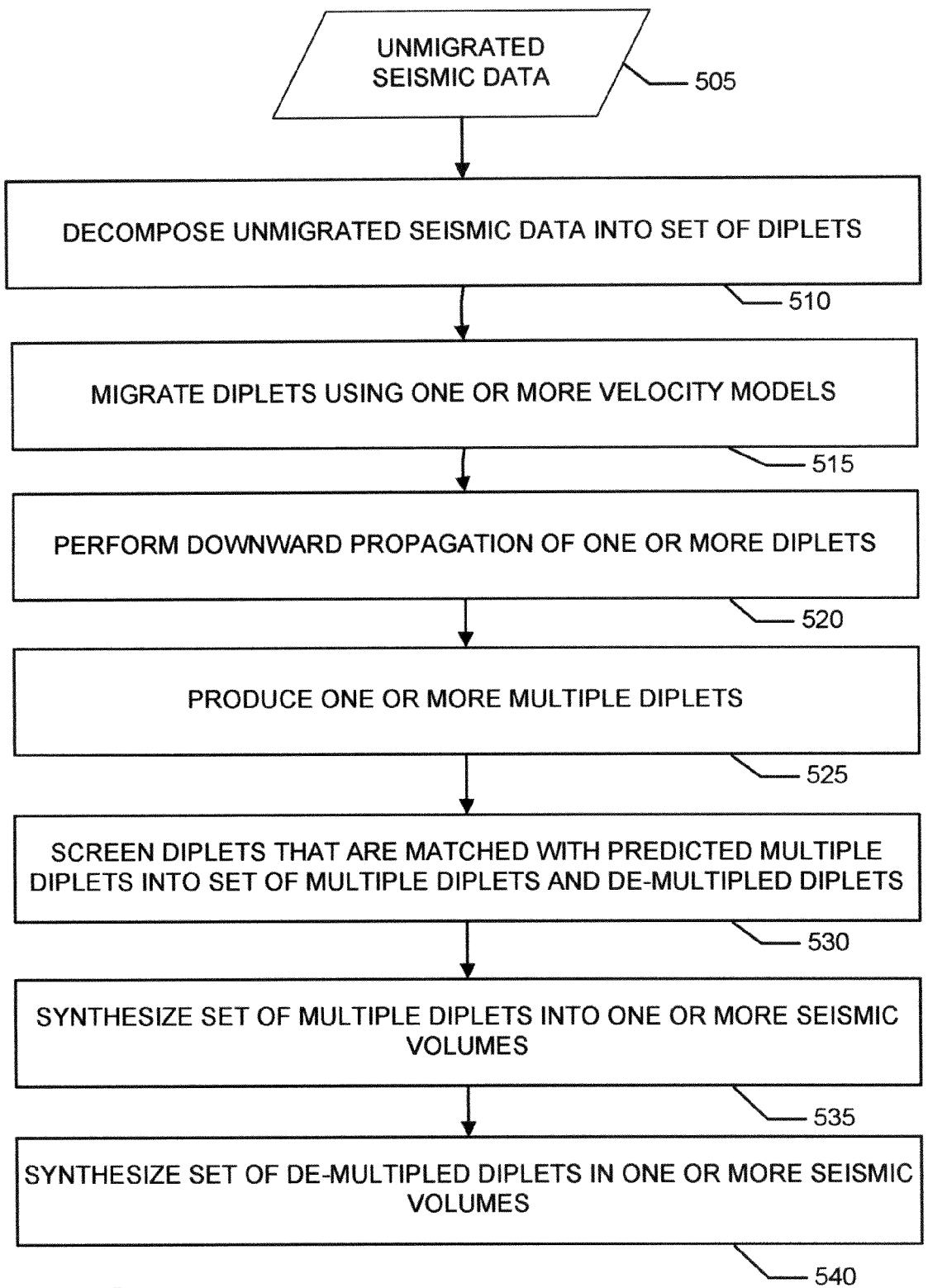
FIGS. 5-6 are flow charts of example methods of the present disclosure.

FIG. 5 is a block diagram showing an example method for 3D multiple prediction and removal using diplets in the unmigrated domain. The system receives unmigrated seismic data (block 505) and decomposes the unmigrated seismic data into diplets (block 510). In certain implementations, the system performs data preparation on the unmigrated seismic data before decomposing the seismic data into diplets. Example data preparation includes data binning to offset gathers for narrow azimuth seismic data. Another example data preparation includes creating super shots for seismic data in shot record. The input data may include one or more offset volumes or one or more super shots. The system then migrates one or more of the diplets using a velocity model (block 515). In certain example implementations, the velocity model is an isotropic velocity model. In other example implementations, the velocity model is an anisotropic velocity model.

The system then performs a downward propagation of one or more of the diplets (block 520). In certain example implementations, the downward propagation is performed, at least in part, by using Snell's law to model one or more reflections of one or more diplets at subsurface discontinuities. Example subsurface discontinuities include one or more of water bottom, top salt, or base salt.

In block 525, the system then generates one or more predicted multiple diplets based, at least in part, on the one or more of the input diplets generated, for example, in block 510, and the one or more corresponding downward propagated and reflected signals (i.e., predicted multiple diplets) generated, for example, in block 520. In one example implementation, the system generates predicted multiple diplets by convolving the one or more diplets generated, for example, in block 510, and the one or more corresponding downward propagated and reflected signals generated, for example, in block 520. In certain implementations, the system performs blocks 520 and 525 for each of the input diplets generated in block 510.

In block 530, the system screens input diplets that are matched with the predicted multiple diplets identified in block 525. In this way, the system classifies the diplets created in block 510 into two sets: a set of multiple diplets and a set of de-multipled diplets. Certain example implementations of block 530 include matching based on one or more of a migrated time, a migrated depth, a dip, and one or more wavelet characteristics.

In block 535, the system synthesizes one or more diplets from the set of multiple diplets into one or more seismic volumes. These synthesized volumes can be used, for example, as multiple models for more advanced adaptive subtraction.

In block 540, the system synthesizes one or more diplets from the set of de-multipled diplets into one or more seismic volumes. These volumes are used, for example, for one or more of subsequent seismic data processing, seismic imaging, and seismic interpretation.

Figure 6:
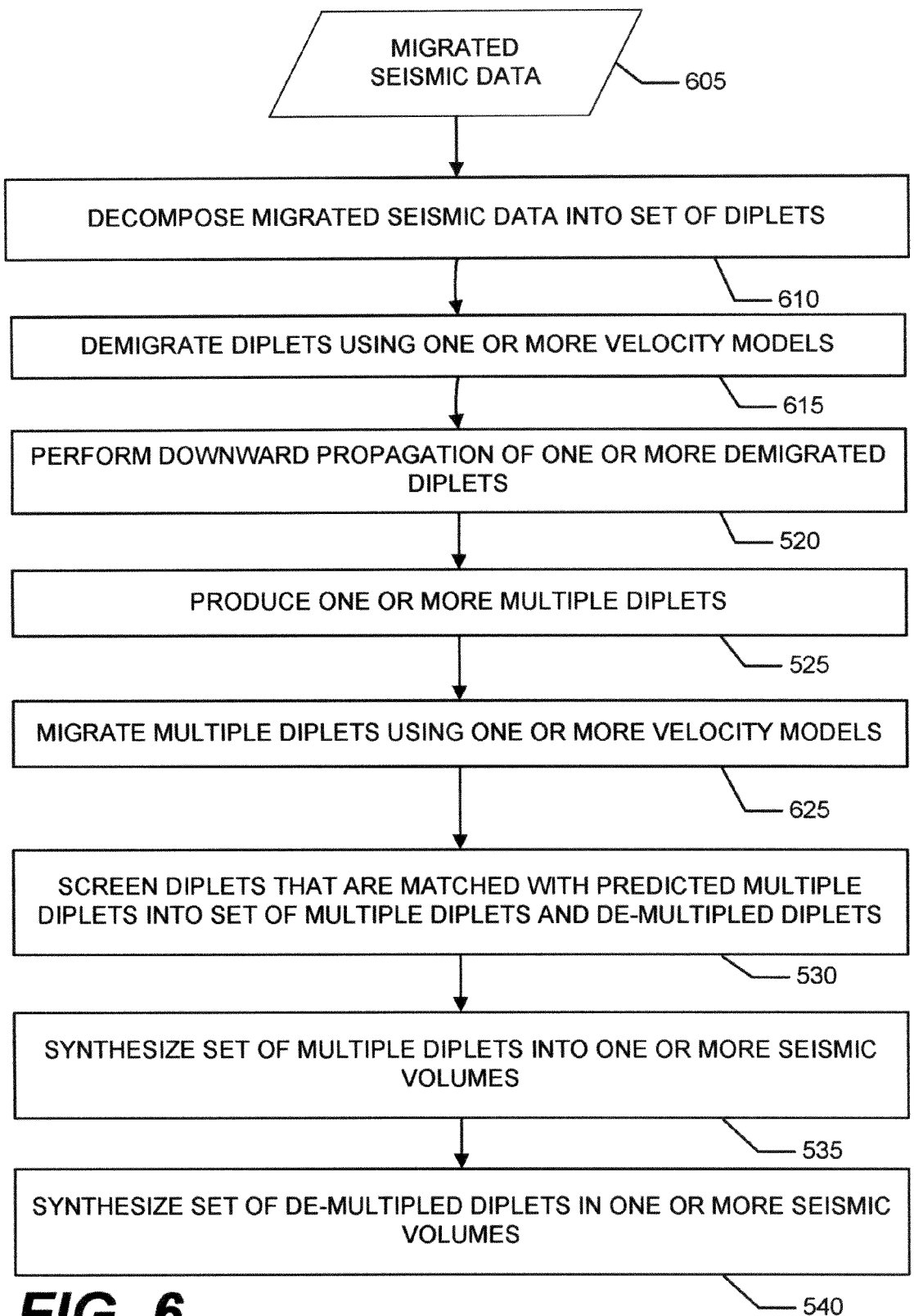

FIG. 6 is a flow chart showing an example method for 3D multiple prediction and removal using diplets in the migrated domain. The system receives migrated seismic data (block 605). The system decomposes the migrated seismic data into a set of input diplets (block 610). The system then demigrates the diplets using one or more velocity models (block 615). In certain example implementations, the velocity model is an isotropic velocity model. In other example implementations, the velocity model is an anisotropic velocity model. The system then performs a downward propagation of one or more of the diplets, as described with respect to block 520 of FIG. 5. The system then determines one or more multiple diplets, as described with respect to block 525 of FIG. 5. In block 625, the multiple diplets are migrated using the velocity model used in block 615. After migration, the system screens diplets from the set of input diplets into a set of multiple diplets and a set of demultipled diplets, as described with respect to bock 530 of FIG. 5.

Figure 2:
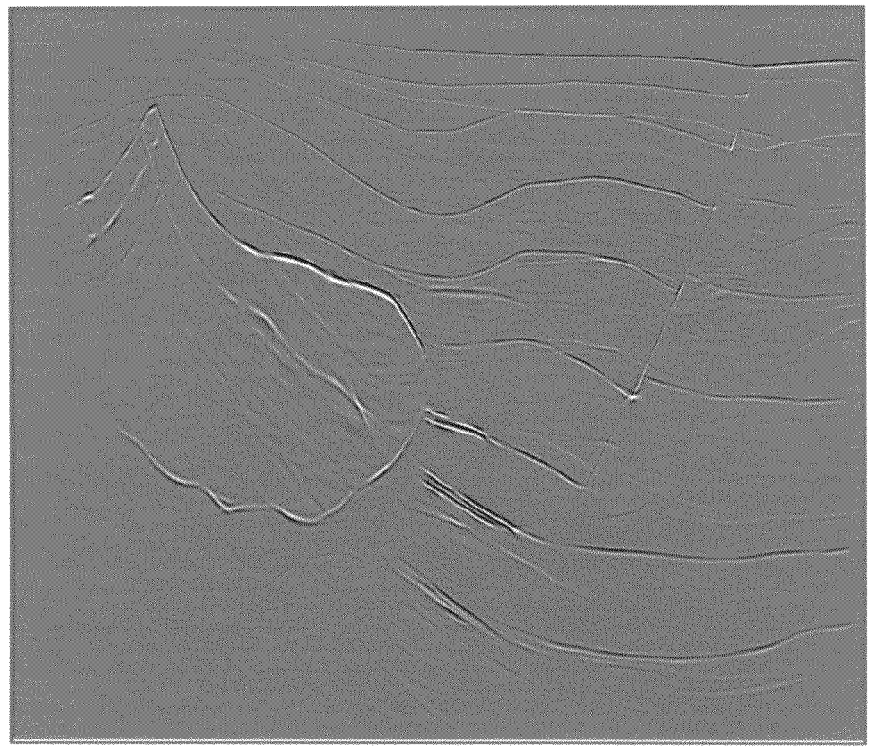
FIGS. 2-4 are example diplet migration images.
Figure 3:
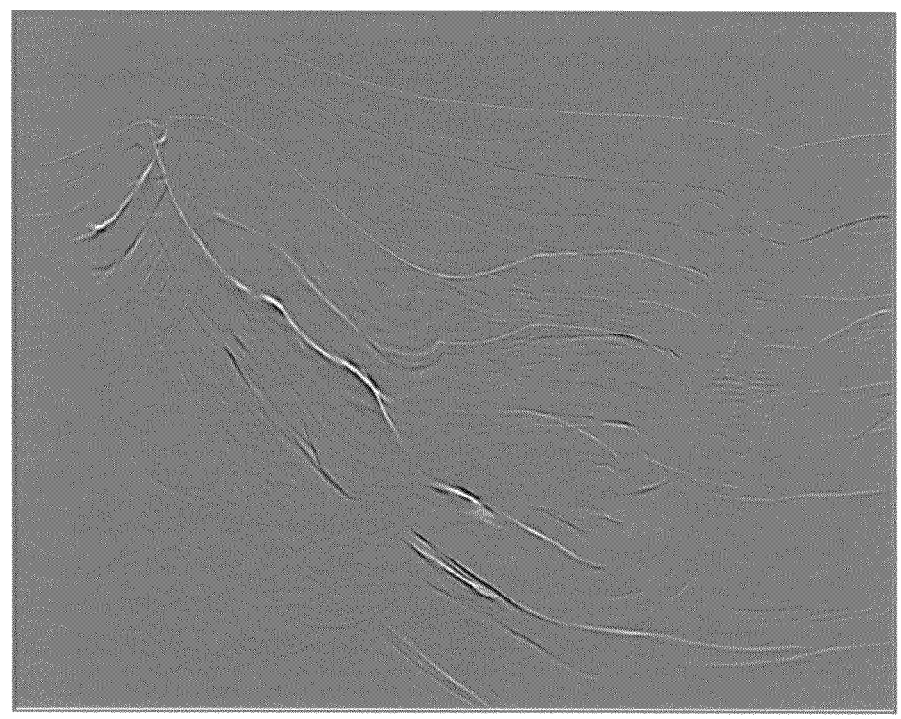
Figure 4:
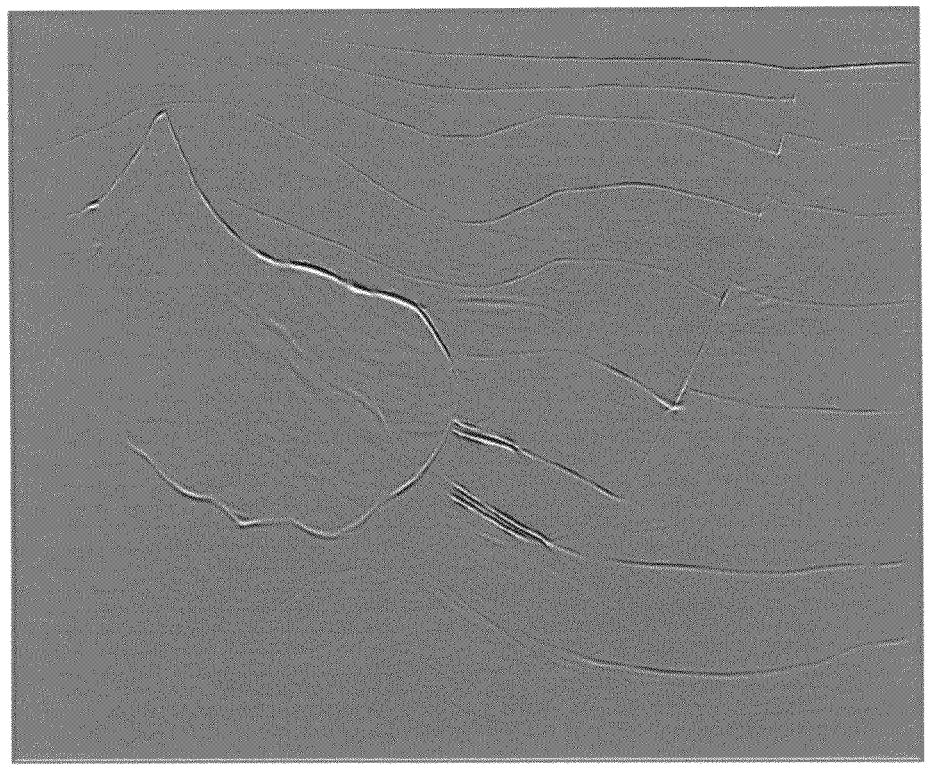

In one example implementation of the present disclosure, the Amerada Hess 2D anisotropic synthetic data was used. A pseudo-3D dataset was created by duplicating the original data in the crossline direction 7 times. This 3D dataset was then decomposed into a series of diplets in time-domain and migrated using the true anisotropic velocity model, as shown in FIG. 1. FIG. 2 shows the diplet migration image. Since the input synthetic data contains many multiples and no multiple removal processing has been applied, there are many multiples in the migrated image. We started with this image volume and the velocity model shown in FIG. 1. Following the method described above, we obtained another image volume that contains all predicted multiples in the migrated depth domain, as shown in FIG. 3. FIG. 3 shows the image for predicted multiples. FIG. 4 shows another image that has those predicted multiples removed by screening out those diplets that match predicted Multiple Diplets. We observe significant attenuation of multiples in the original image.

Although this disclosure has referred to diplets, the methodology discussed here can be used to predict and remove multiples using high order spatial wavelets in addition to diplets. Example high order spatial wavelets include curvelets, Gaussian packets, and beamlets. The reference to curvelets can be found in, for example, Candes, E. J. and Donoho D. L. Continuous curvelet transform: I. resolution of the wavefront set: Applied Computation Harmonic Analysis, pp 162-197 (2002). A reference to Gaussian packets can be found in Cerveny, V. Seismic ray theory: Cambridge University Press (2001). A reference to beamlets can be found in Wu R. S. and Chen L., Wave Propagation and imaging using Gabor-Daubechies beamlets: Theoretical and Computational Acoustics, World Scientific, New Jersey, pp 661-670 (1992).

The methods of the present disclosure described above may be implemented in software to run on one or more computers, where each computer includes one or more processors, a memory, and may include further data storage, one or more input devices, one or more output devices, and one or more networking devices. The software includes executable instructions stored on a tangible medium.

The above methods may be used to determine where to perform subterranean activities, such as well placement, drilling or fracturing. The methods described above may be used to control activities such as drilling or fracturing.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

The invention claimed is:

1. A method comprising:
   determining a set of input diplets;
   for one or more data diplets from the set of input diplets:
      downward propagating the data diplet to model reflection of the data diplet at a location of at least one subsurface discontinuity;
      determining one or more predicted multiple diplets, based, at least in part on the data diplet and the modeled downward propagated and reflected diplet; and
      comparing diplets in the set of input diplets with the one or more multiple diplets to determine a set of multiple diplets and a set of demultipled diplets,
   wherein at least one of the acts of determining the set of input diplets, downward propagating the data diplet to model reflection, determining one or more predicted multiple diplets and comparing diplets is performed by a processor-based machine.

2. The method of claim 1, wherein determining a set of input diplets comprises:
   decomposing unmigrated seismic data into diplets; and
   migrating the diplets using a velocity model.

3. The method of claim 1, wherein determining a set of input diplets comprises:
   decomposing migrated seismic data into diplets; and
   demigrating the diplets using a velocity model.

4. The method of claim 1, wherein determining one or more predicted multiple diplets, based, at least in part on the data diplet and the modeled downward propagated and reflected diplet, comprises:
   convolving the data diplet and the downward propagated and reflected signal of the data diplet.

5. The method of claim 1, further comprising:
   synthesizing the set of demultipled diplets into one or more seismic volumes.

6. The method of claim 1, further comprising:
   synthesizing the set of multiple diplets into one or more seismic volumes.

7. An article comprising a non-transitory computer readable storage medium to store instructions that when executed by at least one processor cause the at least one processor to:
   determine a set of input diplets;
   for one or more data diplets from the set of input diplets:
      downward propagate the data diplet to model reflection of the data diplet at a location of at least one subsurface discontinuity;
      determine one or more predicted multiple diplets, based, at least in part on the data diplet and the modeled downward propagated and reflected diplet; and
      compare diplets in the set of input diplets with the one or more multiple diplets to determine a set of multiple diplets and a set of demultipled diplets.

8. The article of claim 7, the storage medium storing instructions that when executed by the at least one processor cause the at least one processor to:
   decompose unmigrated seismic data into diplets; and
   migrate the diplets using a velocity model.

9. The article of claim 7, the storage medium storing instructions that when executed by the at least one processor cause the at least one processor to:
   decompose migrated seismic data into diplets; and
   demigrate the diplets using a velocity model.

10. The article of claim 7, the storage medium storing instructions that when executed by the at least one processor cause the at least one processor to:
    convolve the data diplet and the downward propagated and reflected signal of the data diplet.

11. The article of claim 7, the storage medium storing instructions that when executed by the at least one processor cause the at least one processor to:

synthesize the set of demultipled diplets into one or more seismic volumes.

12. The article of claim 7, the storage medium storing instructions that when executed by the at least one processor cause the at least one processor to:
synthesize the set of multiple diplets into one or more seismic volumes.

13. An apparatus comprising:
at least one processor;
a memory, wherein the memory comprises executable instructions that when executed cause the at least one processor to:
determine a set of input diplets;
for one or more data diplets from the set of input diplets:
downward propagate the data diplet to model reflection of the data diplet at a location of at least one subsurface discontinuity;
determine one or more predicted multiple diplets, based, at least in part on the data diplet and the modeled downward propagated and reflected diplet; and
compare diplets in the set of input diplets with the one or more multiple diplets to determine a set of multiple diplets and a set of demultipled diplets.

14. The apparatus of claim 13, wherein the at least one processor is adapted to:
decompose unmigrated seismic data into diplets; and
migrate the diplets using a velocity model.

15. The apparatus of claim 13, wherein the at least one processor is adapted to:
decompose migrated seismic data into diplets; and
demigrate the diplets using a velocity model.

16. The apparatus of claim 13, wherein the at least one processor is adapted to:
convolve the data diplet and the downward propagated and reflected signal of the data diplet.

17. The apparatus of claim 13, further comprising executable instructions that cause at least one processor to:
synthesize the set of demultipled diplets into one or more seismic volumes.

18. The apparatus of claim 13, further comprising executable instructions that cause at least one processor to:
synthesize the set of multiple diplets into one or more seismic volumes.

* * * * *